(12) United States Patent
Sakurai (10) Patent No.: US 8,161,032 B2
(45) Date of Patent: Apr. 17, 2012

(54) THREAD RANKING SYSTEM AND THREAD RANKING METHOD (75) Inventor: Shigeaki Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1217 days.

(21) Appl. No.: 11/873,799

(22) Filed: Oct. 17, 2007

(65) Prior Publication Data

US 2008/0098399 A1 Apr. 24, 2008

(30) Foreign Application Priority Data

Oct. 18, 2006 (JP) ................. P2006-283278

(51) Int. Cl.
*G06F 17/30* (2006.01)
(52) U.S. Cl. ........................ 707/709; 707/728
(58) Field of Classification Search .............. 707/3, 728, 707/709; 718/103, 100
See application file for complete search history.

(56) References Cited

U.S. PATENT DOCUMENTS

| | | | |
|---|---|---|---|
| 7,761,447 B2 * | 7/2010 | Brill et al. ................ | 707/728 |
| 2003/0120649 A1 * | 6/2003 | Uchino et al. .............. | 707/5 |
| 2005/0144162 A1 * | 6/2005 | Liang ..................... | 707/3 |
| 2005/0246161 A1 | 11/2005 | Sakurai | |
| 2006/0026593 A1 * | 2/2006 | Canning et al. ............ | 718/100 |
| 2006/0271533 A1 | 11/2006 | Sakurai et al. | |
| 2007/0252201 A1 | 11/2007 | Kito et al. | |
| 2007/0282940 A1 * | 12/2007 | Sakurai ................... | 709/202 |

FOREIGN PATENT DOCUMENTS

| | | |
|---|---|---|
| JP | 09-081630 | 3/1997 |
| JP | 2002-082981 | 3/2002 |
| JP | 2003-242176 | 8/2003 |
| JP | 2005-166062 | 6/2005 |

OTHER PUBLICATIONS

Japanese Office Action dated May 20, 2008 corresponding to U.S. Appl. No. 11/873,799, filed Oct. 17, 2007.
Sakurai et al, Extraction of Reputation Information from Bulletin Board Sites, Sep. 2005, IEICE SIN Notes W12-2005-35, pp. 41-46.

\* cited by examiner

*Primary Examiner* — James Trujillo
*Assistant Examiner* — Thong Vu
(74) *Attorney, Agent, or Firm* — Turocy & Watson, LLP (57) ABSTRACT

A thread ranking system includes: a thread collector for collecting a thread from a bulletin board website, a thread information storage for storing the collected thread, an event extractor for extracting the event from respective threads by using the event knowledge stored in the event knowledge storage, a related expression extractor for extracting a related expression characterizing the thread from expressions contained in the thread every thread, an input/output controller for presenting information that calls upon the user to input an evaluation of a predetermined thread to the user and inputting an evaluation of the user, a related expression importance calculator for calculating importance based on the input evaluation of the user every related expression, and a thread ranking unit 8 for deciding ranks of respective threads based on the extracted event and the calculated importance every related expression.

13 Claims, 7 Drawing Sheets

THREAD RELATED EXPRESSION VECTOR

| RELATED EXPRESSION | NUMBER OF ARTICLES |
|---|---|
| PC | 10 |
| CPU | 12 |

FIG. 6

RELATED EXPRESSION VECTOR

| RELATED EXPRESSION | IMPORTANCE |
|---|---|
| PC | 1 |
| DESIGN | 1 |

FIG. 7

RELATED EXPRESSION VECTOR

| RELATED EXPRESSION | IMPORTANCE |
|---|---|
| PC | 1 |
| DESIGN | 1 |
| CPU | 1 |

FIG. 8

THREAD RELATED EXPRESSION VECTOR

| RELATED EXPRESSION | NUMBER OF ARTICLE |
|---|---|
| PC | 11 |
| DESIGN | 13 |

FIG. 9

| RANK | THREAD TITLE |
|---|---|
| 1 | TITLE 1 |
| 2 | TITLE 2 |
| 3 | TITLE 3 |
| 4 | TITLE 4 |
| 5 | TITLE 5 |

FIG. 10

| RANK | THREAD TITLE |
|---|---|
| 1 | TITLE 1 |
| 2 | TITLE 2 |
| 3 | TITLE 4 |
| 4 | TITLE 5 |
| 5 | TITLE 6 |

FIG. 11

RELATED EXPRESSION VECTOR

| RELATED EXPRESSION | IMPORTANCE |
|---|---|
| PC | 1 |
| DESIGN | 0 |
| CPU | 2 |

RELATED EXPRESSION CANDIDATE VECTOR

| RELATED EXPRES-<br>SION CANDIDATE | NUMBER OF<br>ARTICLES |
|---|---|
| PC | 25 |
| CPU | 15 |
| PROBLEM | 100 |
| CONNECTION | 40 |

FIG. 14

| RELATED EXPRES-<br>SION CANDIDATE | NUMBER OF<br>ARTICLES |
|---|---|
| PC | 10 |
| CPU | 12 |
| PROBLEM | 10 |

US 8,161,032 B2

THREAD RANKING SYSTEM AND THREAD RANKING METHOD

RELATED APPLICATION(S)

The present disclosure relates to the subject matter contained in Japanese Patent Application No. 2006-283278 filed on Oct. 18, 2006, which is incorporated herein by reference in its entirety.

FIELD

The present invention relates to a thread ranking system and a thread ranking method for ranking a set (thread) of articles belonging to the particular topic in a bulletin board website.

BACKGROUND

Nowadays, a large number of bulletin board websites exist on the Web, and many discussions are held in a form called "threads" in each site. Among these threads, the notable threads developed into an extensive discussion that has an influence upon even the business activities. However, these notable threads are buried in a huge number of unnoticeable threads. For this reason, a technology to extract the notable thread in conformity with an interest of a user is desired.

As one of such technologies, there is disclosed in JP-A-2003-242176 (which is also published as US 2003/0140309 A1) a method of correcting a weight of a word contained in a topic in which a user is interested, by correcting a weight of a word contained in an E-mail having higher frequency of sending.

However, the technology described in JP-A-2003-242176 cannot correct a weight of the word contained in the topic in which the user is not interested. Also, a weight of the word cannot always be adequately corrected since a wide variety of words are described in the E-mail. As a result, such a problem existed that the topic adapted to the user's interest cannot be extracted adequately.

SUMMARY

According to a first aspect of the invention, there is provided a thread ranking system including: an event knowledge storage that stores an event knowledge that is a feature expression to be used for extracting an event in which a user is interested from threads; a collecting unit that collects the threads from a bulletin board website on a communication network, each of the threads containing a plurality of articles including a title and a main body; a thread information storage that stores the threads collected by the collecting unit; an event extracting unit that extracts the event from respective threads stored in the thread information storage, by using the event knowledge stored in the event knowledge storage; a related expression extracting unit that extracts a related expression characterizing each of the threads from expressions contained in the threads, by referring to the threads stored in the thread information storage; a presentation unit that presents information to the user for allowing the user to input an evaluation of a predetermined thread stored in the thread information storage; an input unit that allows the user to input the evaluation of the predetermined thread; a related expression importance calculation unit that calculates importance based on the evaluation of the user input through the input unit for the respective related expressions; and a thread ranking unit that determines ranks of the respective threads stored in the thread information storage based on the event extracted by the event extracting unit and the importance calculated by the related expression importance calculation unit.

According to a second aspect of the invention, there is provided a method for ranking threads, the method including: collecting the threads from a bulletin board website on a communication network, each of the threads containing a plurality of articles including a title and a main body; storing the threads collected by the collecting unit; extracting the event from the stored threads by using an event knowledge that is a feature expression to be used for extracting an event in which a user is interested from threads; extracting a related expression characterizing each of the threads from expressions contained in the threads, by referring to the stored threads; presenting information to the user for allowing the user to input an evaluation of a predetermined thread from among the stored threads; allowing the user to input the evaluation of the predetermined thread; calculating importance based on the input evaluation for the respective related expressions; and determining ranks of the respective stored threads based on the extracted event and the calculated importance.

DETAILED DESCRIPTION OF THE EMBODIMENTS

Referring now to the accompanying drawings, an embodiment of the present invention will be described in detail.

Figure 1:
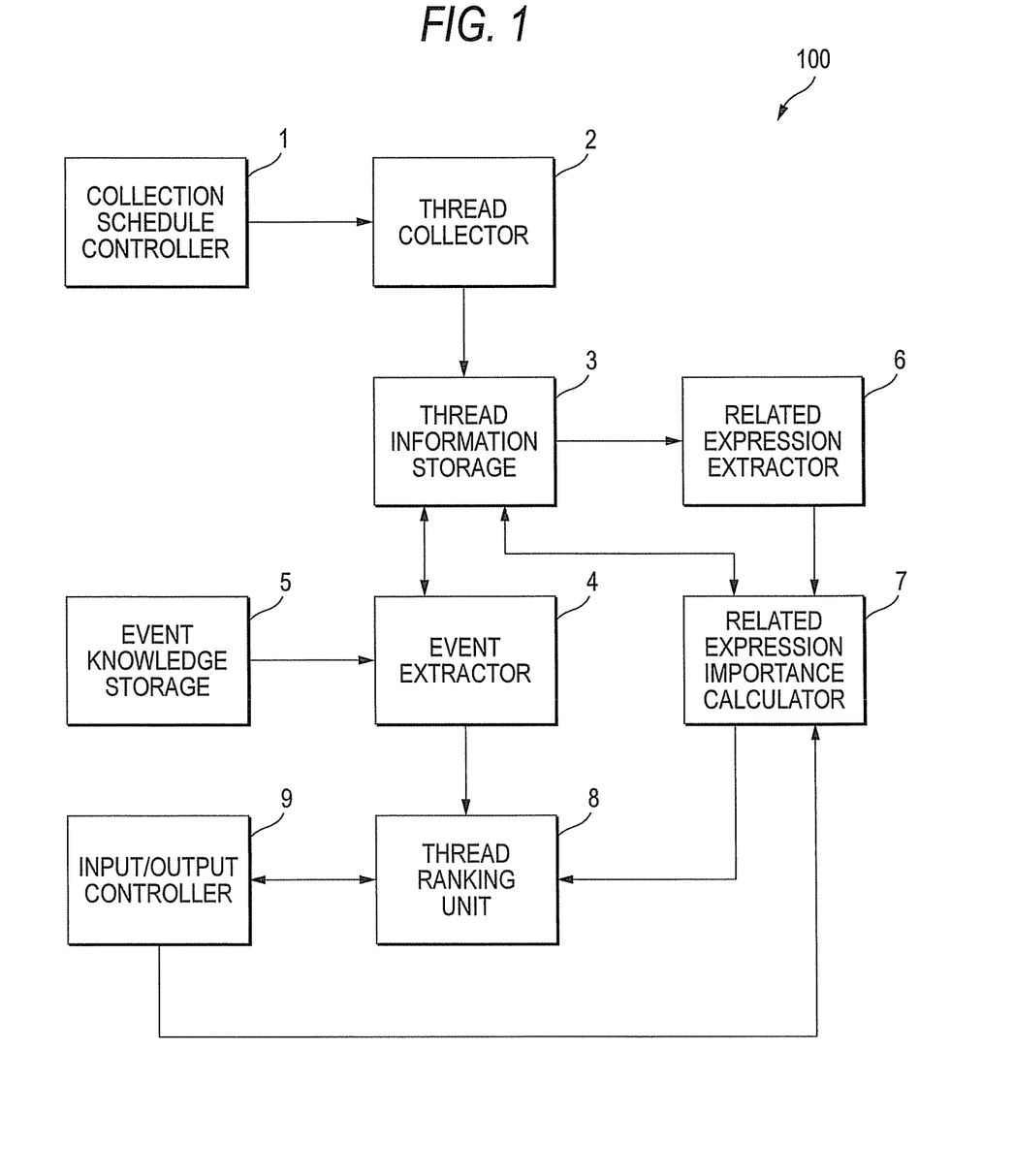
FIG. 1 is a block diagram showing a configuration of a thread ranking system according to an embodiment of the present invention.

FIG. 1 shows a configuration of a thread ranking system 100 according to the embodiment of the present invention. The thread ranking system 100 is a system that ranks respective threads on the bulletin board websites existing on the communication network such as the Internet, or the like. As shown in FIG. 1, the thread ranking system 100 includes a collection schedule controller 1, a thread collector 2, a thread information storage 3, an event extractor 4, an event knowledge storage 5, a related expression extractor 6, a related expression importance calculator 7, a thread ranking unit 8, and an input/output controller 9.

The collection schedule controller 1 controls a schedule for collecting the thread from the designated bulletin board websites existing on the communication network.

The thread collector 2 collects the threads from the bulletin board websites in accordance with the thread collection start command issued from the collection schedule controller 1.

The thread information storage 3 stores various data. As the data, there are the thread collected by the thread collector 2, the morphological analysis result of the topic contained in the thread, thread related expression vector (pair of the related expression contained in one thread and the number of articles containing the related expression), the related expression candidate vector (pair of the related expression candidate contained in all threads and the number of articles containing the related expression candidate), the related expression vector (pair of the related expression contained in all threads and the importance), the cumulative number of articles of the thread, and others.

The event extractor 4 extracts the event contained in each article (described later) by applying the event knowledge (described later) stored in the event knowledge storage 5 to the morphological analysis result of respective articles constituting the thread.

Figure 12:
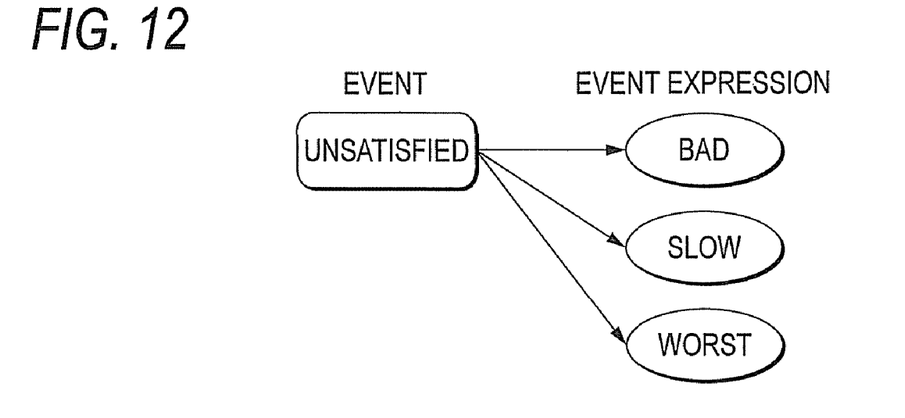
FIG. 12 is a view showing an example of the event knowledge stored in an event knowledge storage.

The event knowledge storage 5 stores data of the event knowledge as the feature expression applied to extract the event in which the user has an interest from the thread. For example, as shown in FIG. 12, in the case of the event "unsatisfied", the event expressions such as "bad", "slow", and "worst" are stored in the event knowledge storage 5 as the event knowledge.

The related expression extractor 6 extracts the related expression characterizing the concerned thread from the expressions contained in the threads every thread, by referring to the threads stored in the thread information storage 3.

The related expression importance calculator 7 calculates importance of the related expression based on a user's evaluation of the thread being input from the input/output controlling portion 9.

The thread ranking unit 8 ranks the threads based on the event extracted by the event extractor 4 and the importance calculated by the related expression importance calculator 7.

The input/output controller 9 outputs the data (information) presented to the user, and inputs the data transmitted from the user's terminal (e.g., PC (Personal Computer)). Which means, that the input/output controller 9 serves as a presentation unit and input unit for presenting and inputting the data.

Figure 2:
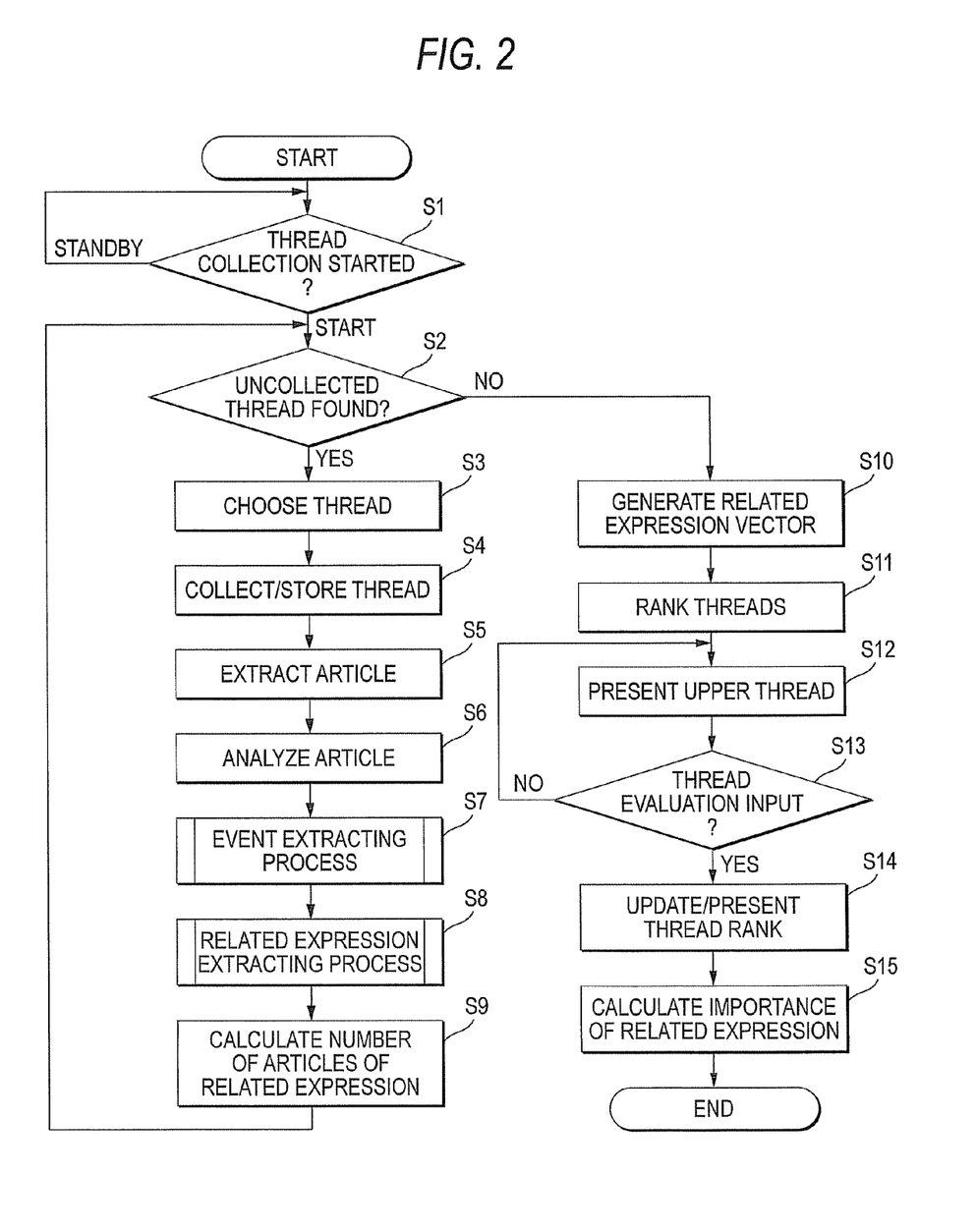
FIG. 2 is a flowchart showing a flow of overall processes executed in the thread ranking system according to the embodiment.

A flow of overall processes executed in the thread ranking system 100 will be explained with reference to a flowchart shown in FIG. 2.

First, the collection schedule controller 1 compares a preceding time at which the thread was previously collected with a present time, and determines whether to start the thread collection (step S1). In step S1, if a difference between a preceding collection time and a present time is below a predetermined threshold value, the thread collection is brought into a standby state (step S1; standby). Then, the process returns to step S1. In step S1, if the difference between a preceding collection time and a present time is in excess of the predetermined threshold value, the collection schedule controller 1 controls the thread collector 2 to start the thread collection (step S1; start). The preceding collection time is updated to the present time. Then, the process proceeds to step S2.

When the thread collector 2 is controlled by the collection schedule controller 1 to start the thread collection, the thread collector 2 determines whether or not the uncollected thread exists in the bulletin board website that is defined as a target of the process (step S2). In step S2, if it is decided that the uncollected thread does not exists (step S2; NO), the process proceeds to step S10 (described later).

In step S2, if it is decided that the uncollected thread is present (step S2; YES), one thread is chosen from the uncollected threads (step S3). Then, in the thread collector 2, the thread chosen in step S3 is collected and stored in the thread information storage 3 (step S4). More specifically, in step S4, all articles contained in the thread chosen in step S3 are downloaded from the bulletin board website, and then the downloaded article is stored in the thread information storage 3.

Then, the event extractor 4 extracts a main body portion of the article that is written by a contributor from the articles contained in the thread chosen in step S3 (step S5).

Then, the event extractor 4 applies the morphological analysis to the main body portion of the article extracted in step S5, and thus the main body portion of the article is divided into the words and then parts of speech corresponding to the words are assigned (step S6). The morphological analysis result is stored in the thread information storage 3. For example, when the main body portion of the article is "CPU is very slow", the morphological analysis such that "CPU <alphabet>/is <verb>/very <adverb>/slow <adjective>/. <punctuation>/" is applied, and then the morphological analysis result is stored in the thread information storage 3.

Then, the event extractor 4 executes the event extracting process of extracting the events contained in respective articles in the thread, by applying the event knowledge stored in the event knowledge storage 5 to the morphological analyses of respective articles (step S7). The event extracting process in step S7 will be explained in detail with reference to FIG. 3 later.

Then, the related expression extractor 6 executes the related expression extracting process to extract the related expression characterizing the concerned thread from the thread as the processing target stored in the thread information storage 3 (step S8). The related expression extracting process in step S8 will be explained in detail with reference to FIG. 4 later.

Figure 5:
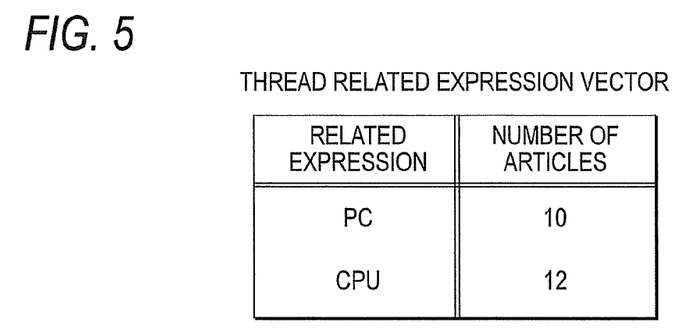
FIG. 5 is a view showing an example of a thread related expression vector.

Then, the related expression extractor 6 calculates the number of articles (frequency) in which the related expression extracted in step S8 appears in the thread as the processing target (step S9). Thus, a thread related expression vector having the related expression extracted in step S8 and the number of articles calculated in step S9 as a pair is generated and stored in the thread information storage 3. For example, "PC" and "CPU" are extracted from the thread t1 as the related expression, and then the thread related expression vector shown in FIG. 5 is generated for the thread t1 when the number of articles containing each related expression is 10, 12 respectively.

If processes of all collected threads in steps S3 to S9 are completed and the uncollected thread is not found (step S2; NO), a related expression vector representing a list of the related expressions in all threads and their importance is generated in the related expression importance calculator 7 (step S10). More specifically, in step S10, it is decided whether or not the related expression extracted in step S8 corresponds to a new related expression. Then, when the related expression is decided as the new related expression, this new related expression is added to the related expression vector and an importance of the related expression is initialized.

Figure 6:
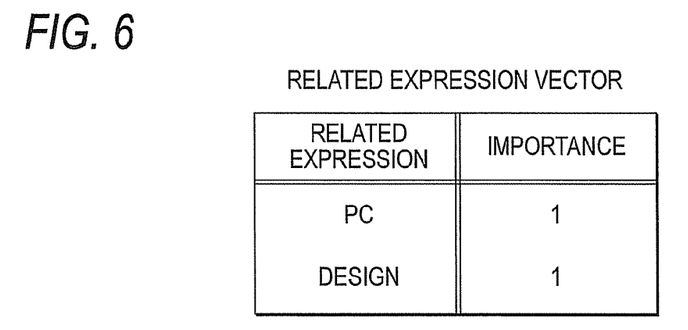
FIG. 6 is a view showing an example of a related expression vector stored in a thread information storage.
Figure 7:
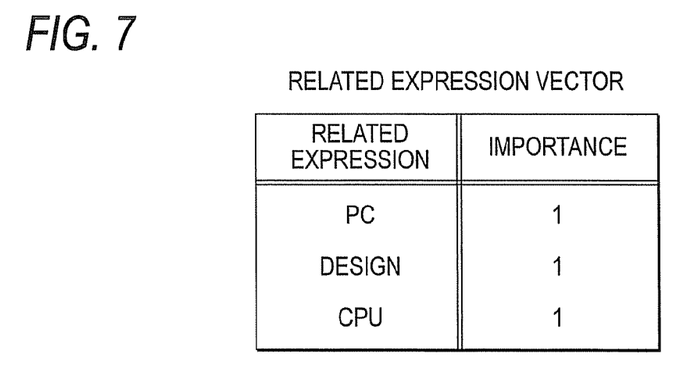
FIG. 7 is a view showing the related expression vector when a new related expression "CPU" is added to the related expression vector in FIG. 6.

For example, as shown in FIG. 6, if "PC" and "design" have already been registered in the related expression vector as the related expression and also "PC" and "CPU" are extracted in step S8 by the related expression extractor 6 as the related expression, "CPU" is added to the related expression vector as the new related expression and 1 (initial value) is set as the importance of the new related expression. In this case, the related expression vector is updated as shown in FIG. 7.

Then, in the thread ranking unit 8, the importance of thread is calculated every thread based on the event extracted by the event extractor 4 and the importance of the related expression calculated by the related expression importance calculator 7, and the threads are ranked such that the thread having the higher importance of thread is positioned in higher rank (step S11). An example of calculation for calculating the importance of thread is shown by the following Formula (1).

$$\text{Importance of thread} = \text{number of articles of event} \times \sum_i \frac{v_i}{\sum_j v_j} \times \frac{w_{f(i)}}{\sum_k w_k} \quad (1)$$

In the above-shown Formula (1), the number of articles of event is the number of articles containing the event extracted from the thread as the processing target by the event extractor 4, $v_i$ is the number of article of the i-th related expression in the thread, $w_k$ is the importance of the k-th related expression in the related expression vector, and f(i) is a function of pointing a position of the thread expression vector corresponding to the i-th related expression of the thread.

Figure 8:
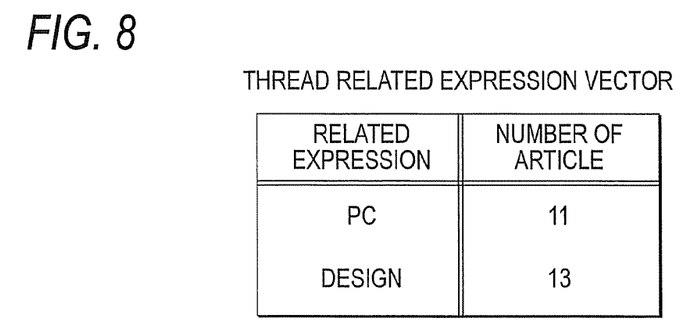
FIG. 8 is a view showing an example of the thread related expression vector stored in the thread information storage.

For example, assuming that two threads t1, t2 are ranked. At this time, assuming that the thread related expression vector shown in FIG. 5 is generated for the thread t1 and the thread related expression vector shown in FIG. 8 is generated for the thread t2. Also, assuming that the number of articles containing the event (see FIG. 12) corresponding to "unsatisfied" for the thread t1 is 20 and the number of articles containing the event corresponding to "unsatisfied" for the thread t2 is 25, and assuming that the related expression vector shown in FIG. 7 is generated. In this case, the thread importance of the thread t1 is given as 6.67=20×[{10/(10+12)}×{1/(1+1+1)}+{12/(10+12)}×{1/(1+1+1)}] by the Formula (1). Also, the thread importance of the thread t2 is given as 8.33=25×[{11/(11+13)}×{1/(1+1+1)}+{13/(11+13)}×{1/(1+1+1)}]. Therefore, since a numerical value of the thread importance of the thread t2 is large, the first rank is given to the thread t2 and the second rank is given to the thread t1.

When the rank is given to the threads respectively, a screen for calling upon the user to input the upper threads (e.g., the threads in the first to fifth ranks) and evaluations of these threads is presented to the user terminal via the communication network under control of the input/output controller 9 (step S12).

While the evaluations of the threads presented in step S12 are not input by the user, the thread ranking system 100 is brought into a standby state (step S13; NO). If the evaluations ("interested" or "not interested") of the threads are input into the input/output controller 9 by the user (step S13; YES), the thread rank is updated by the thread ranking unit 8 based on the input evaluation contents and a screen showing the updated upper threads is presented to the user terminal by the input/output controller 9 (step S14).

Figure 9:
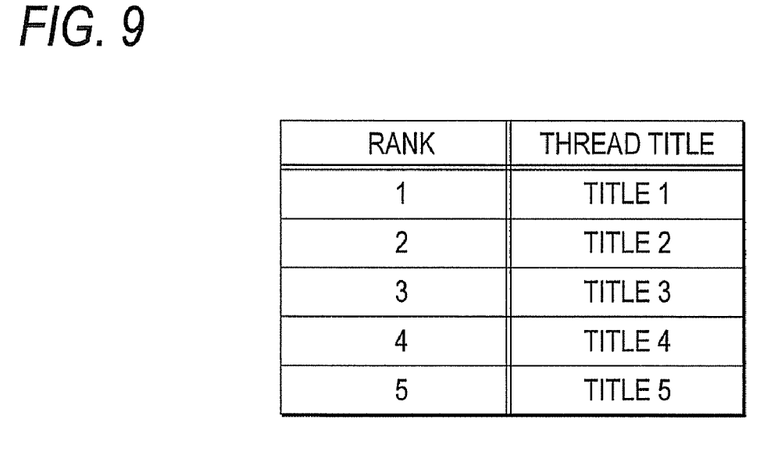
FIG. 9 is a view showing a relationship between a thread title and its ranking.
Figure 10:
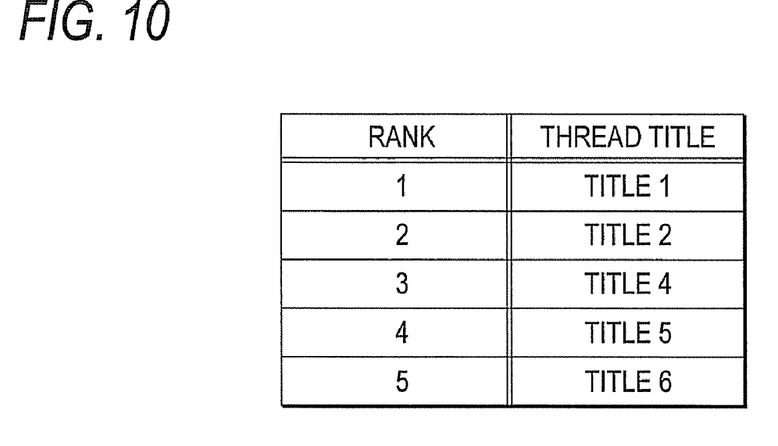
FIG. 10 is a view showing an example in which the ranks of respective threads shown in FIG. 9 are changed according to the user's evaluation.

In step S14, the threads that the user evaluated to be "interested" are left in the upper threads, but the threads that the user evaluated to be "not interested" are deleted from the upper threads. The threads in subsequent ranks are presented instead of the deleted threads. For example, suppose that five upper threads (thread titles) are presented by the input/output controller 9, as shown in FIG. 9. At this time, if the user evaluated the thread in the third rank at present (title 3) to be "not interested", the thread in the third rank at present is deleted while the threads in the fourth and fifth ranks at present are updated in the third and fourth ranks respectively. The thread in the sixth rank at present is presented as a new fifth thread. The updated result at this time is given in FIG. 10.

When the ranks of the threads are updated, importance of the related expression is calculated by the related expression importance calculator 7 based on the user's evaluation for the threads being input from the input/output controller 9 (step S15). Then, the overall process in the thread ranking system 100 is ended. More specifically, in step S15, the updated result of the threads from the input/output controller 9 is accepted by the related expression importance calculator 7, and the related expression that is contained in the "interested" thread but is not contained in the "not interested" thread is extracted and the importance is added. Also, the related expression that is contained in the "not interested" thread but is not contained in the "interested" thread is extracted and the importance is subtracted.

Figure 11:
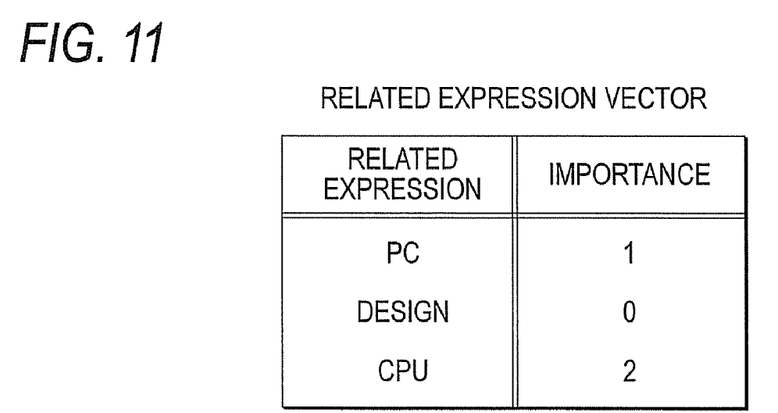
FIG. 11 is a view showing an example of the thread related expression vector in which the related expression vector in FIG. 7 is updated.

For example, assuming that "PC" and "CPU" are given as the related expression corresponding to the "interested" thread, and "PC" and "design" are given as the related expression corresponding to the "not interested" thread. Also, suppose that the importance of respective related expressions is given as shown in FIG. 7. At this time, 1 is added to the importance of the related expression "CPU", and 1 is subtracted from the importance of the related expression "design". At this time, the importance of respective related expressions is updated as shown in FIG. 11.

The thread rank is updated in the subsequent thread ranking in response to such update of the importance. For example, if the importance of respective related expressions is given as shown in FIG. 11 and only the events corresponding to "unsatisfied" (see FIG. 12) are extracted in the event extracting process (step S7) of respective threads, the thread ranking system 100 can recognize the user's intention indicating that the user is not interested in the dissatisfaction about "design" in the next ranking of the thread such that the thread containing the dissatisfaction about "design" is not positioned in the upper ranks. When the thread in which the discussion relating "design" was held at first is shifted to the discussion concerning the dissatisfaction about "CPU", the thread containing the dissatisfaction about "CPU" can be positioned next time in the upper ranks.

Figure 3:
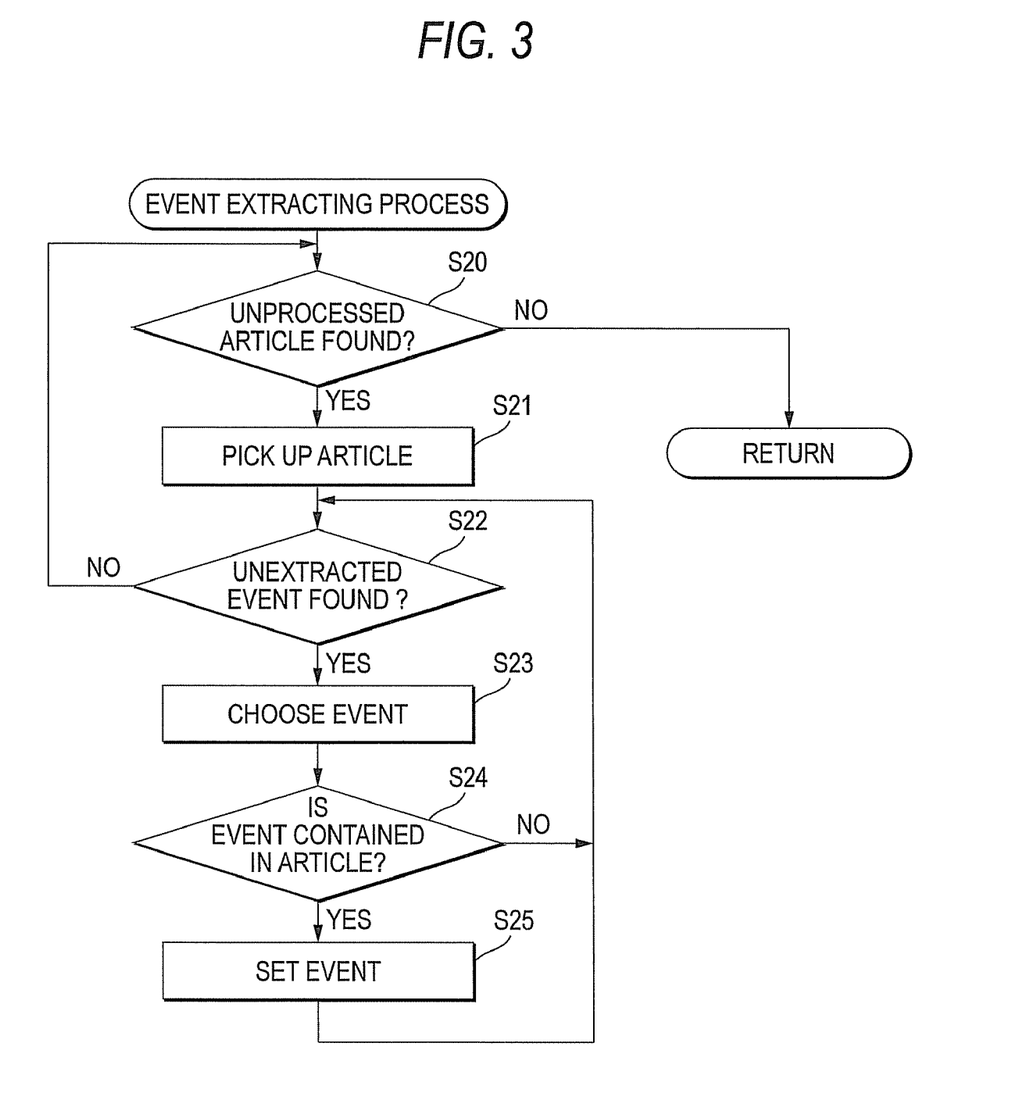
FIG. 3 is a flowchart showing details of an event extracting process shown in step S7 in FIG. 2.

Next, the event extracting process executed in the event extractor 4 (step S7 in FIG. 2) will be explained in detail with reference to a flowchart in FIG. 3 hereunder.

First, it is decided whether or not the unprocessed article is found from the articles constituting the thread (step S20). In step S20, if it is decided that the unprocessed article is not present (step S20; NO), this event extracting process is ended.

In contrast, in step S20, if it is decided that the unprocessed article is present (step S20; YES), one article of the process target is picked up (step S21).

Then, it is decided whether or not the event not extracted yet is found in the articles packed up in step S21, by referring to the event knowledge storage 5 (step S22). In step S22, if it is decided that the event not extracted yet is not found (step S22; NO), the process returns to step S20. In contrast, if it is decided that the event not extracted yet is found (step S22; YES), one unextracted event is chosen (step S23).

For example, assuming that only the knowledge concerning the unsatisfied event is stored in the event knowledge storage 5. At this time, it is decided that the event not extracted yet is found in the process in step S22 applied to the article picked up in step S21 for the first time, and then the unsatisfied event is chosen in step S23. In contrast, it is decided that the event not extracted yet is not found in the process in step S22 applied for the second time, and then the event extraction of the concerned article is ended. Then, the process returns to step S20.

Following step S23, it is decided whether or not the event chosen in step S23 is contained in the article picked up in step S21, by referring to the knowledge stored in the event knowledge storage 5 every event (step S24).

In step S24, if it is decided that the event is not contained (step S24; NO), the process returns to step S22. In contrast, in step S24, if it is decided that the event is contained (step S24; YES), the event chosen in step S23 is set to the article picked up in step S21 (step S25). Also, 1 is added to the number of articles containing the concerned event in the thread as the process target at present. Then, the process returns to step S22.

For example, assuming that the knowledge of the unsatisfied event as shown in FIG. 12 is stored in the event knowledge storage 5. At this time, if the event expression shown in FIG. 12 is contained in the main body of the article that was subjected to the morphological analysis, it is decided that the concerned event is contained. For example, assuming that the main body of the article that was subjected to the morphological analysis is "CPU <alphabet>/is <verb>/very <adverb>/slow <adjective>/. <punctuation>/", "slow" is contained in the event expression corresponding to the unsatisfied event as shown in FIG. 12. Therefore, it is decided that the concerned article contains the unsatisfied event.

The event that the thread contains as well as the number of articles containing such event can be obtained by executing such event extracting process.

Figure 4:
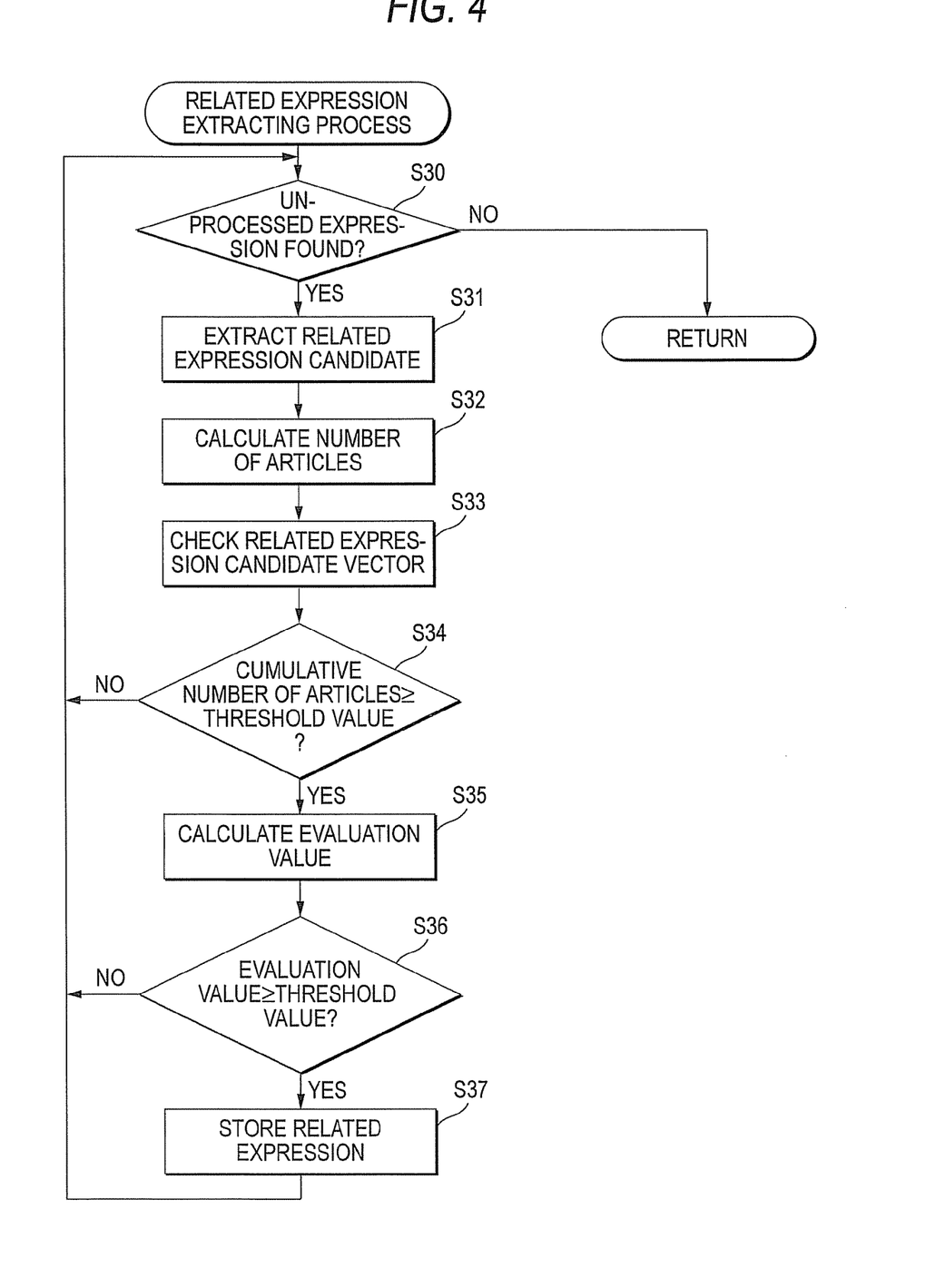
FIG. 4 is a flowchart showing details of a related expression extracting process shown in step S8 in FIG. 2.

Next, the related expression extracting process executed in the related expression extractor 6 (step S8 in FIG. 2) will be explained in detail with reference to a flowchart in FIG. 4 hereunder.

First, it is decided whether or not the unprocessed expression out of the expressions having the predetermined parts of speech is found from a set of the thread morphological analysis in which results of the morphological analysis applied to the main body of the article contained in the thread as the process target are summed up (step S30).

In step S30, if it is decided that the unprocessed expression is not found (step S30; NO), this related expression extracting process is ended. In contrast, in step S30, if it is decided that the unprocessed expression is found (step S30; YES), this unprocessed expression is extracted as the related expression candidate (step S31).

For example, when "<alphabet>" indicating the word consisting of the alphanumeric is designated as a part of speech and the article of "CPU <alphabet>/is <verb>/very <adverb>/slow <adjective>/. <punctuation>/" is contained in the thread, "CPU" is extracted as the related expression candidate in step S31.

Then, the related expression candidate extracted in step S31 is applied to the set of the thread morphological analyses stored in the thread information storage 3. Thus, the number of articles in which this related expression candidate is contained in the thread of the process target, i.e., a frequency at which this related expression candidate appears is calculated (step S32).

Then, the related expression candidate vector having the related expression candidates of all threads stored in the thread information storage 3 and the number of articles as a pair is checked, and the number of articles calculated in step S32 concerning the related expression candidates extracted in step S31 is added to the related expression candidate vector (step S33). Here, assuming that the related expression candidate vector is stored in the thread information storage 3 in the same data structure as the thread related expression vector shown in FIG. 5.

In step S33, it is decided whether or not the related expression candidate extracted in step S31 is the new related expression candidate. If it is decided that this related expression candidate is the new related expression candidate, this new related expression candidate and the number of articles are added to the related expression candidate vector. In contrast, if the related expression candidate extracted in step S31 has already existed in the related expression candidate vector, the number of articles of this related expression candidate is added to the related expression candidate vector. In addition, the number of articles contained in that thread is added to the cumulative number of articles of all threads stored in the thread information storage 3.

Then, it is decided whether or not the cumulative number of articles of all threads is in excess of a predetermined threshold value (step S34). In step S34, if it is decided that the cumulative number of articles is below the predetermined threshold value (step S34; NO), the process returns to step S30. In contrast, if it is decided that the cumulative number of articles is more than or equal to the predetermined threshold value (step S34; YES), the process proceeds to step S35.

For example, in the case where the cumulative number of articles in all threads stored in the thread information storage 3 is 900 and the number of articles serving as the predetermined threshold value is 1000, if 900 articles are contained in the thread as the process target, the process returns to step S30. If 100 articles are contained in the thread, the process proceeds to step S35.

In step S35, an evaluation value of the related expression candidate of the concerned thread is calculated, by analyzing the related expression candidate vector and the related expression candidate calculated for the thread as the process target and the number of articles. An example of calculation for calculating the evaluation value is shown by the following Formula (2).

$$\text{Evaluation value} = \frac{N_1}{N_2} \quad (2)$$

In the above-shown Formula (2), $N_1$ is "number of articles containing the related expression candidate in the thread", while $N_2$ is "number of articles containing the related expression candidate in the related expression candidate vector".

Figure 13:
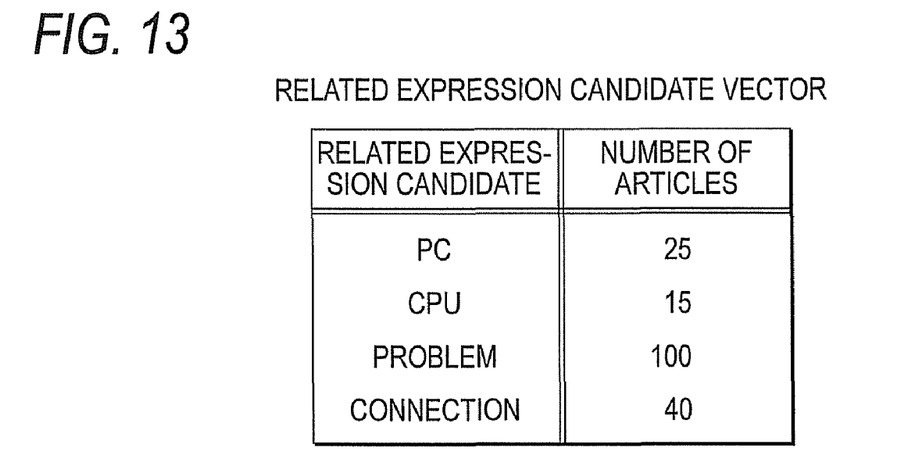
FIG. 13 is a view showing an example of a related expression candidate vector stored in the thread information storage.
Figure 14:
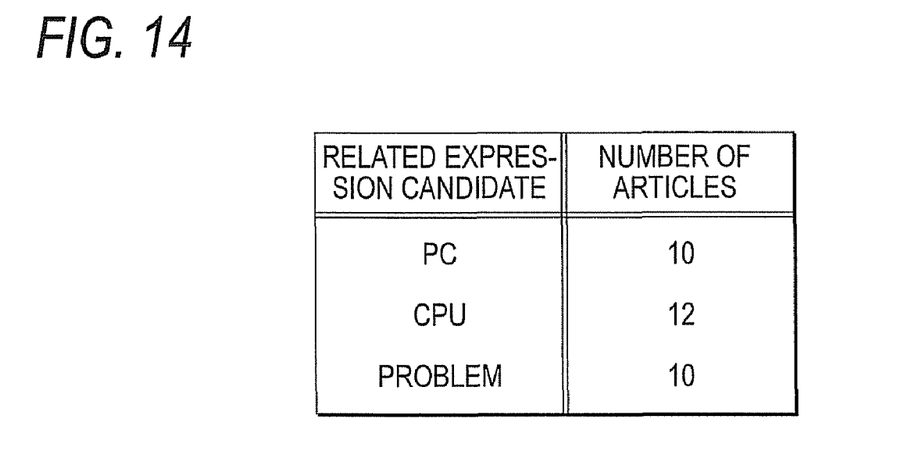
FIG. 14 is a view showing relationships between the related expression candidate extracted from a particular thread and the number of articles containing the related expression candidate.

For example, assuming that the related expression candidate vector is given as shown in FIG. 13 and also the related expression candidate of the thread as the process target and the number of articles are given as shown in FIG. 14. In this case, the evaluation values corresponding to the related expression candidates "PC", "CPU", and "problem" are given as 0.4 (=10/25), 0.8 (=12/15), and 0.1 (=10/100) respectively.

Then, it is decided whether or not the evaluation value corresponding to the related expression candidate calculated in step S35 is in excess of a predetermined threshold value (step S36). In step S36, if it is decided that the evaluation value corresponding to the related expression candidate is below the predetermined threshold value (step S36; NO), the process returns to step S30. In contrast, if it is decided that the evaluation value exceeds the predetermined threshold value (step S36; YES) the process proceeds to step S37.

For example, assuming that the predetermined threshold value is 0.4 in step S36 and "problem" out of the related expression candidates shown in FIG. 14 is now processed, the process proceeds to step S30 because the evaluation value is smaller than the threshold value. In contrast, when the related expression candidates "PC" and "CPU" are now processed, the process proceeds to step S37 because both evaluation values exceed the threshold value.

In step S37, the related expression candidate whose evaluation value exceeds the threshold value as well as the number of articles containing the related expression is stored in the thread information string portion 3 as the related expression. For example, the related expressions shown in FIG. 5 and the number of articles are stored in the thread information string portion 3 with respect to the related expression candidates shown in FIG. 14. The related expression and the number of articles can be extracted every thread by executing such process.

As described above, according to the thread ranking system 100, the thread can be characterized by the event extraction and the related expression extraction, and the rank of the thread can be decided based on the user's evaluation. Therefore, the thread adapted to the user's interest can be positioned in the upper rank in view of the transition of the contents of the thread.

Therefore, such a situation can be prevented that the threads that are not adapted to the user's interest at a present point of time are positioned in the higher rank at a next point of time. On the contrary, when the discussion in the thread is shifted to the contents that are fitted the user's interest with a lapse of time, this thread can be positioned in the higher rank. As a result, even when the thread that the user determines once as the unnecessary thread is changed to the thread in which the user is interested, the system of the embodiment can present the thread in which the user is interested to the user not to miss such thread.

The above-described thread ranking system 100 according to the embodiment may be modified as follows.

In the embodiment, the thread ranking unit 8 executes the thread ranking by using a combination of one event and the related expression vector. However, the ranking may be executed by combining a plurality of events and the related expression vector together. At this time, it is preferable that the importance of thread in Formula (1) should be calculated by weighting respective events (a weighting based on the learning effect or a predetermined weighting). Also, a weight in calculating the importance of thread may be changed based on respective users of the bulletin board website.

In the embodiment, the feature expression of the event is stored in the event knowledge storage 5 as the event knowledge, and then the event extractor 4 determines the presence or absence of the event according to whether or not that event knowledge is contained in the main body of the article constituting the thread. However, the presence or absence of the event may be decided by utilizing the method set forth in the following document.

S. Sakurai, R. Orihara: "Extraction of Reputation Information from Bulletin Board Sites", IEICE SIG Notes WI2-2005-35, p. 41-46 (2005-09).

In this case, the classification model learned by SVM (Support Vector Machine) is inductively learned as the knowledge stored in the event knowledge storage 5, by utilizing the trained data having the article and data pointing whether or not the event is present as a pair. Also, the presence or absence of the event is decided by applying the article to the classification model.

In the embodiment, the related expression extractor 6 extracts the expressions having the particular part of speech from the set of the thread morphological analysis as the related expression candidate. However, the expression having the particular row of part of speech may be extracted from the set of the thread morphological analysis.

In the embodiment, the related expression extractor 6 calculates the number of articles containing the related expression from all articles contained in the thread as the object. However, the related expression may be extracted by classifying the articles every article contained in the particular event and then calculating the evaluation value every article containing the particular event.

In the embodiment, the related expression importance calculator 7 updates the importance by adding 1 to the importance of the related expression that is contained in the "interested" thread for the user but is not contained in the "not interested" thread for the user and subtracting 1 from the importance of the related expression that is contained in the "not interested" thread for the user but is not contained in the "interested" thread for the user. In place of this method, a difference between the related expression that is contained in the "interested" thread for the user and the related expression that is contained in the "not interested" thread for the user may be calculated and this difference may be utilized in the update of the importance.

As described heretofore, there is provided a thread ranking system and a method for ranking a thread that extracts the notable thread appropriately by ranking threads in conformity with user's interest.

It is to be understood that the invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from all components shown in the embodiment. Further, the components in different embodiments may be used appropriately in combination.

What is claimed is:
1. A thread ranking system comprising:
an event knowledge storage that stores an event knowledge that is a feature expression to be used for extracting an event in which a user is interested from threads;
a collecting unit that collects the threads from a bulletin board website on a communication network, each of the threads containing a plurality of articles including a title and a main body;
a thread information storage that stores the threads collected by the collecting unit;

an event extracting unit that extracts the event from respective threads stored in the thread information storage, by using the event knowledge stored in the event knowledge storage;

a related expression extracting unit that extracts a related expression characterizing each of the threads from expressions contained in the threads, by referring to the threads stored in the thread information storage;

a presentation unit that presents information to the user for allowing the user to input an evaluation of a predetermined thread stored in the thread information storage;

an input unit that allows the user to input the evaluation of the predetermined thread;

a related expression importance calculation unit that calculates importance based on the evaluation of the user input through the input unit for the respective related expressions; and a thread ranking unit that determines ranks of the respective threads stored in the thread information storage based on the event extracted by the event extracting unit and the importance calculated by the related expression importance calculation unit, wherein the event extracting unit operates to:

apply a morphological analysis to the main body of each of the articles contained in the threads; and extract an event corresponding to the event knowledge when an expression indicated by the event knowledge stored in the event knowledge storage is contained in the main body of the article to which the morphological analysis is applied.

2. The system according to claim 1, wherein the related expression extracting unit operates to:

extract an expression having a predetermined feature as a related expression candidate from a target thread that is subjected to the process;

compare a number of articles containing the related expression candidate in the target thread with a number of articles containing the related expression candidate in all of the threads stored in the thread information storage; and extract the related expression from the related expression candidate based on the comparison result.

3. The system according to claim 2, wherein the related expression extracting unit operates to:

calculate a rate, as an evaluation value to be used for extracting the related expression, of the number of articles containing the related expression candidate in the target thread to the number of articles containing the related expression candidate in all of the threads stored in the thread information storage; and extract the related expression candidate as the related expression when the evaluation value exceeds a predetermined threshold value.

4. The system according to claim 3, wherein the related expression extracting unit calculates the evaluation value when a cumulative number of articles of all of the threads stored in the thread information storage exceeds a predetermined threshold value.

5. The system according to claim 1, wherein the presentation unit presents information for allowing the user to input evaluations on top threads of a predetermined number from among the threads stored in the thread information storage.

6. The system according to claim 1, wherein the thread ranking unit operates to:

calculate the importance of the respective threads based on (1) the number of articles of the event contained in the respective threads, (2) the number of articles contained in the respective threads for each one of the related expression, and (3) the importance calculated by the related expression importance calculation unit for the respective threads; and determine a rank of the respective threads based on the importance calculated for the respective threads.

7. The system according to claim 1, wherein respective processes performed by the collecting unit, the thread information storage, the event extracting unit, the related expression extracting unit, the presentation unit, the input unit, the related expression importance calculation unit, and the thread ranking unit are repeated in accordance with a predetermined schedule.

8. A method for ranking threads, the method comprising:

collecting the threads from a bulletin board website on a communication network, each of the threads containing a plurality of articles including a title and a main body;

storing the threads collected by the collecting unit; extracting the event from the stored threads by using an event knowledge that is a feature expression to be used for extracting an event in which a user is interested from threads;

extracting a related expression characterizing each of the threads from expressions contained in the threads, by referring to the stored threads;

presenting information to the user for allowing the user to input an evaluation of a predetermined thread from among the stored threads;

allowing the user to input the evaluation of the predetermined thread;

calculating importance based on the input evaluation for the respective related expressions; and determining ranks of the respective stored threads based on the extracted event and the calculated importance, wherein the event is extracted by performing:

applying a morphological analysis to the main body of each of the articles contained in the threads; and extracting an event corresponding to the event knowledge when an expression indicated by the stored event knowledge is contained in the main body of the article to which the morphological analysis is applied.

9. The method according to claim 8, wherein the related expression is extracted by performing:

extracting an expression having a predetermined feature as a related expression candidate from a target thread that is subjected to the process;

comparing a number of articles containing the related expression candidate in the target thread with a, number of articles containing the related expression candidate in all of the stored threads; and extracting the related expression from the related expression candidate based on the comparison result.

10. The method according to claim 9, wherein the related expression is extracted by performing:

calculating a rate, as an evaluation value to be used for extracting the related expression, of the number of articles containing the related expression candidate in the target thread to the number of articles containing the related expression candidate in all of the stored threads; and extracting the related expression candidate as the related expression when the evaluation value exceeds a predetermined threshold value.

11. The method according to claim 10, wherein the evaluation value is calculated when a cumulative number of articles of all of the threads stored in the thread information storage exceeds a predetermined threshold value.

12. The method according to claim 8, wherein when the information for allowing the user to input evaluations is presented, the information on top threads of a predetermined number from among the stored threads is presented.

13. The method according to claim 8, wherein the rank of the threads is determined by performing:

calculating the importance of the respective threads based on (1) the number of articles of the event contained in the respective threads, (2) the number of articles contained in the respective threads for each one of the related expression, and (3) the importance calculated for the respective threads; and determining a rank of the respective threads based on the importance calculated for the respective threads.

* * * * *